Oct. 21, 1969  A. QUENOT  3,473,754
INSTRUMENT CASING WITH ROTATABLE MEMBER
Filed July 21, 1967
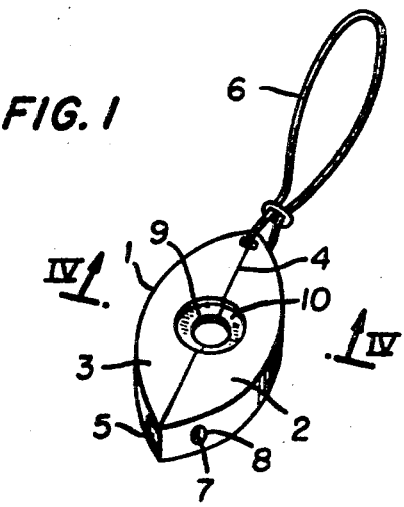
FIG. 1
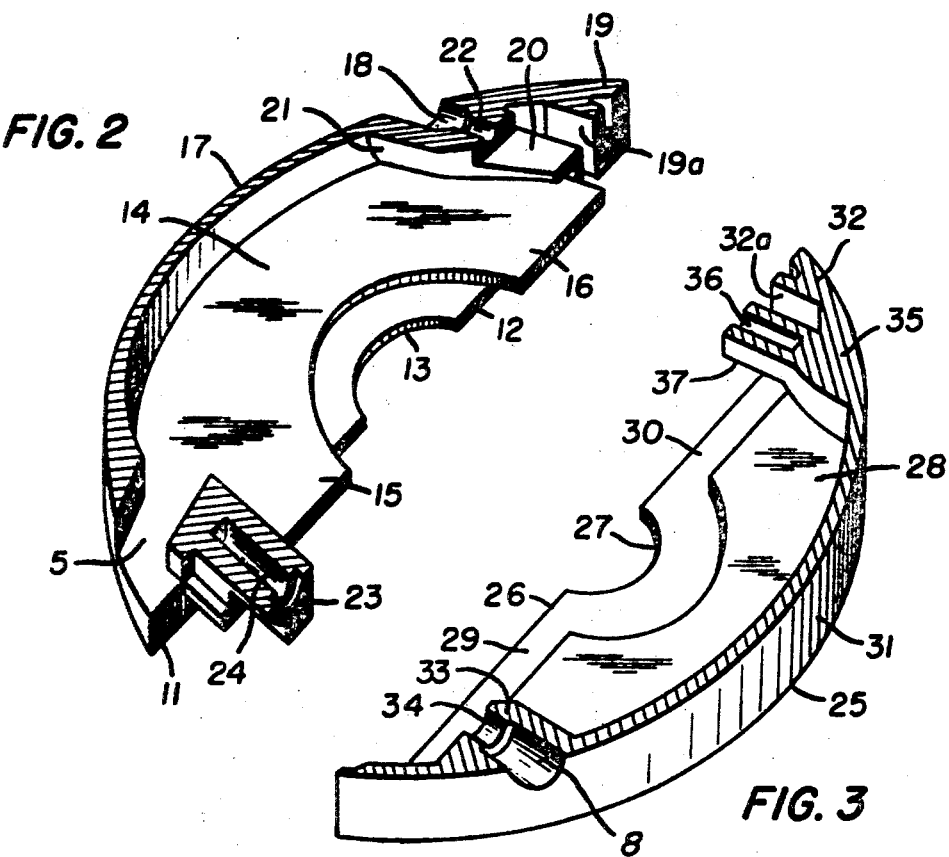
FIG. 2
FIG. 3

United States Patent Office
3,473,754
Patented Oct. 21, 1969

3,473,754
INSTRUMENT CASING WITH ROTATABLE MEMBER
Andre Quenot, Besancon, France, assignor to Quenot & Cie Sarl, Besancon, France, a corporation of France
Filed July 21, 1967, Ser. No. 655,026
Claims priority, application France, Oct. 19, 1966, 80,622
Int. Cl. B65h 75/16, 7/04
U.S. Cl. 242—84.8                                  5 Claims

ABSTRACT OF THE DISCLOSURE

In a casing which contains a rotatable tape drum, a peripheral aperture is provided in the casing for the passage of the tape and the casing has two distinct and separate halves which meet substantially in a plane which is parallel to the axis of rotation of the drum. The halves have interfitting projections and projection-receiving surfaces perpendicular to the axis whereby the halves frictionally engage with one another and have axially-spaced complementary arcuate surfaces which together form circular bearings. The tape drum has a plurality of axially-spaced peripheral circular bearings, complementary to the circular bearings provided in the casing whereby the casing halves can be brought together with the drum between them, the complementary bearings on the drum and casing inter-engaging so that the drum can be rotated on the bearings.

---

The assembly of casings in general poses numerous problems. Thus in the particular case of casings for linear measuring instruments with tapes, various requirements have to be reconciled. The assembly must be resistant, watertight, of small volume, easy to put into operation, of a pleasant aesthetic appearance and inexpensive.

Up to now there have been made casings composed of a bottom surmounted by a cover in such a way that the dividing line between followed the larger perimeter of the casing. Such casings entail a certain number of disadvantages.

First of all, the possibilities of infiltrations are proportional to the length of the dividing line. Additionally, the adjustment of the two parts of the casing taking place along a large perimeter requires a more accurate manufacture of these casings.

Moreover, the clamping depth of the two parts of the casing being limited by the height thereof, the solution of clamping is not satisfactory for very flat casings.

For casings having movable central parts, which is the case of linear measuring instruments, the assembly of these central parts, of the winding drums, of the handles and other parts is delicate especially if a movable part emerge from the casing along its rotational axis.

Consequently, the invention proposes to furnish a casing assembly for linear instrument casings or other casings which makes possible an improved watertightness, a deeper clamping, an easier fastening of the movable central parts and a good appearance while being simple to manufacture, solid and inexpensive.

For this purpose, the invention is concerned with an instrument casing having a mechanism and possessing adjustment and fastening means characterized in that the two halves of the casing are assembled along a plane parallel to the axis of the mechanism.

The invention will be better understood by referring to the following description made by way of non-limiting example as well as to the accompanying drawing in which:

FIGURE 1 is a perspective view of a casing for linear measuring instruments.

FIGURE 2 shows a cross-sectional view of the left halve of the casing the upper part which is symmetrical having been cut away on its central plane parallel to its plane faces.

FIGURE 3 shows a cross-sectional top view of the lower parts the right shell or halve.

Figure 4:
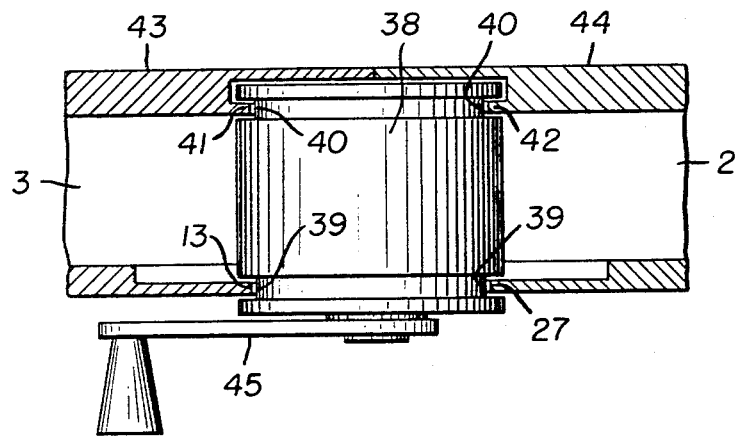
FIGURE 4 shows a partial cross-sectional view taken along the IV—IV of FIGURE 1, for a modification of the casing with the winding mechanism installed.

Reference is made to FIGURE 1.

The moulded casing 1, for example a casing for a ten meter tape, is constituted of two shells 2 and 3 assembled along demarcation line 4. The left shell 3 has an opening 5 for the tangential outlet of the tape measure (not shown). A tassel 6 can be secured to casing 1 to facilitate handling. Sheels 2 and 3 advantageously can have elongated shapes, for example, shapes in segments of circle which permits a good tangential exit of the tape and gives the room necessary for the fastening of tassel 6.

Said casing 1 is assembled by two screws, of which only one, screw 7, placed in opening 8 of the right shell 2 is shown. Shells 2 and 3 have circular orifices of which only orifice 9 is seen on FIGURE 1. This orifice 9 is surrounded by a cylindrical concentric recess 10.

Reference is made to FIGURE 2 which represents the lower part 11 of the slice of left shell 3, the upper part (not shown) of this shell 2 being symmetrical of the lower part 11 in relation to the cross-sectional plane.

The half left shell 11 comprises a flat bottom 12 provided with an arcuate recess 13.

On bottom 12 is located a half ring 14 the two extremities of which 15 and 16 overlap said bottom 12.

Half shell 11 comprises additionally a vertical lateral wall 17 interrupted at the opening 5 of the tape measure (not shown). Said vertical wall 17 additionally has an opening 16 for the introduction of a screw (not shown). Finally, the extremity 19 of vertical wall 17 is augmented and can possibly receive fastening means for tassel 6. For example, tassel 6 can pass through shell 3 through slot 19a (the same is then true for shell 2 which will then have recess 32a).

The bottom 12 of half shell 11 curves around the extremity 16 of the half ring 14 to form a plane surface 20 extended by a cylindrical part 21. Said cylindrical part 21 is pierced by a hole 22 communicating with orifice 18.

On the extremity 15 of ring 14 and constituting one of the limits of the outlet 5 is located a receptacle 23 provided with a hole 24 for receiving screw 7. Said receptacle 23 overlaps the extremity 15 by a certain distance.

Reference is made to FIGURE 3.

The other half shell 25, FIGURE 3, is complementary to half shell 11, FIGURE 2, so that the lower part 30 overhangs the upper part 28 whereas the upper part 14 in FIGURE 2 overhangs the lower part 12, thus the base portions and the top portions of the two half shells fit together arcuate recesses 30, 27 in the upper and lower parts of the base (and of the top), forming circular apertures with the respective recesses 16, 15, FIGURE 2.

The end block 33 opposite to end block 23, FIGURE 2, contains bores 8, 34, similar to holes 18, 22, FIGURE 2. The end block 35, opposite to extremity 19, FIGURE 2, contains internally screwed bore 36, similar to hole 24, FIGURE 2, and contains the other halves of the vertical slot 19a, 32a for the loop tassel 6, FIGURE 1.

Said bottom 26 is partially covered by a half ring 28 recessed so as to define on bottom 26 two zones 29 and 30 which can receive the overlapping extremities 15 and 16 of half ring 14.

Half shell 25 has also a lateral wall 31 perforated by orifices 8. The extremity 32 of wall 32 facing extremity 19 of wall 17 is also thickened.

Half shell 25 has a thickened part 33 which terminates the opening 8 and permits to make the same communicate with holes 24 by a hole 34 when the two shells 2 and 3 are assembled.

Said half-shell 25 also has a receptacle 35 provided with a hole 36 which is placed in front of hole 22 during assembly. The lower hidden face 37 of this receptacle 35 is plane so as to enable placing the same against the plane surface 20 of half shell 11.

There is seen that the assembly of casing 1 only requires two screws because of the clamping of the elements such as 15, 10 and 37. Moreover, the assembly of the mobile central part is very easy since it suffices to engage the slots such as 13 and 27 in the grooves of this central movable part.

Reference is made to FIGURE 4.

In this modification of the invention the rotating mechanism, for example a winding drum 38, has two circular grooves 39 and 40 in its outer periphery. The lower groove 39 engages partially in slot 13 and partially in slot 27. The upper groove 40 engages in ribs 41 and 42 of upper faces 43 and 44 of shells 2 and 3. The upper faces 43 and 44 can, as seen on FIGURE 4, be without axial openings, in such a way that the winding mechanism 38 emerges from casing 1 only by the circular opening formed by slots 13 and 27. In this fashion it is possible for example to drive drum 38 by means of handle 45. Thus the casing itself provides the bearings and no shaft is required.

It is also naturally possible to eliminate slots 13 and 27 to the example of faces 43 and 44 and make a casing having no axial opening.

It is also possible to make semi-circular grooves in the surfaces of the shells, these grooves receiving one or several ribs of the rotating drum.

Finally, it is possible to make all combinations of the above described embodiments permitting the maintenance and the guiding of the rotating part of the mechanism by simple assembly of the two shells.

It will be understood that the adjusting means can be different from those above described. The two shells can be provided with any suitable male and female elements able to become mutually clamped.

One of the shells can carry the male elements, the other carrying the female elements, or each shell can bear both male and female elements. The shells also can be without such elements male and female by the adjusting taking place simply by screwing or by suitable fastening.

Similarly all fastening means can be used. Thus, for example, the two shells can be welded, screwed, glued or force fitted or secured one to the other by any combination of these processes or others.

Figure 5:
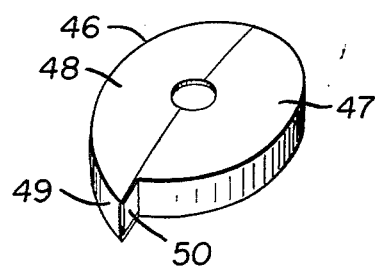
FIGURE 5 shows an assembled perspective view of another type of linear measuring instrument casing.

Reference is made to FIGURE 5.

The linear measuring instrument casing 46 is constituted by two shells 47 and 48. Shell 47 has the shape of a half-circle or any similar shape; shell 48 has an extension 49 providing with a tangential outlet 50 for the tape.

Naturally all casing shapes, round, squared or any whatever can be incorporated in the assembly subject of the present invention.

Although the invention has been described with respect to a particular embodiment thereof, it will be understood that the same is in no way limited thereto and that there can be brought to it various modifications of shape and of material without thereby departing from the framework and the scope of the invention.

What is claimed is:

1. A casing containing a rotatable tape drum, a peripheral aperture in the casing for the passage of the tape, and an exterior winding handle for the drum, and comprising two distinct and separate halves which meet substantially in a plane which is parallel to the axis of rotation of the drum, said halves having interfitting projections and projection-receiving surfaces perpendicular to said axis whereby said halves frictionally engage with one another and have axially-spaced complementary arcuate surfaces which together form circular bearings, said tape drum having a plurality of axially-spaced peripheral circular bearings including at least one flange complementary to said circular bearings of said halves, whereby said casing halves can be brought together with the drum between them with at least said one flange lying outside said casing contact therewith so that said drum can be rotated on said bearings.

2. Casing according to claim 1, wherein said rotatable drum has grooves at the extremities thereof and the lower parts of said halves have a circular hole adapted to surround one of said grooves and the upper parts of said halves have a circular rib adapted to engage the other of said grooves.

3. Casing according to claim 1, wherein one of said halves have a tangential extension provided with an outlet.

4. Casing according to claim 1, wherein one of said halves has at least one orifice for the introduction of a screw and said other half has a corresponding opening for receiving said screw.

5. Casing according to claim 1, wherein said halves have at one end thereof oppositely facing slots forming an opening when said halves are assembled for securing a tassel to said casing.

References Cited

UNITED STATES PATENTS

| 3,141,628 | 7/1964 | Evans | 242—84.8 |
| 3,325,116 | 6/1967 | Quenot | 242—84.8 |

FOREIGN PATENTS

| 596,269 | 4/1960 | Canada. |
| 1,141,175 | 12/1962 | Germany. |
| 46,840 | 3/1909 | Switzerland. |

GEORGE E. LOWRANCE, Primary Examiner

U.S. Cl. X.R.

220—4